US009454783B2

(12) United States Patent
Ho

(10) Patent No.: US 9,454,783 B2
(45) Date of Patent: Sep. 27, 2016

(54) METHOD AND APPARATUS FOR CONDUCTING E-COMMERCE ON A MOBILE HANDSET

(75) Inventor: Edwin Ho, Palo Alto, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2322 days.

(21) Appl. No.: 11/490,721

(22) Filed: Jul. 21, 2006

(65) Prior Publication Data

US 2008/0033832 A1 Feb. 7, 2008

(51) Int. Cl.
*G06Q 30/00* (2012.01)
*G06Q 30/06* (2012.01)
*G06Q 20/32* (2012.01)
*H04M 1/725* (2006.01)
*H04L 29/06* (2006.01)

(52) U.S. Cl.
CPC ........ *G06Q 30/0641* (2013.01); *G06Q 20/322* (2013.01); *G06Q 30/0619* (2013.01); *H04L 65/60* (2013.01); *H04M 1/72558* (2013.01); *H04M 1/72561* (2013.01); *G06Q 30/06* (2013.01); *G06Q 30/0601* (2013.01)

(58) Field of Classification Search
USPC ........................ 705/26–27, 51–59, 26.1–27.2
See application file for complete search history.

(56) References Cited

U.S. PATENT DOCUMENTS

| | | | |
|---|---|---|---|
| 6,061,719 A * | 5/2000 | Bendinelli et al. ........... 709/218 |
| 6,829,368 B2 * | 12/2004 | Meyer et al. ................. 382/100 |
| 6,891,811 B1 | 5/2005 | Smith et al. |
| 7,028,071 B1 * | 4/2006 | Slik ............................... 709/201 |
| 7,065,342 B1 * | 6/2006 | Rolf ............................ 455/412.1 |
| 7,343,157 B1 * | 3/2008 | Mitchell ........................ 455/431 |
| 7,343,179 B1 * | 3/2008 | Theis et al. ................... 455/567 |
| 7,353,258 B2 * | 4/2008 | Washburn ..................... 709/206 |
| 7,355,990 B2 | 4/2008 | Smith et al. |
| 7,987,280 B1 * | 7/2011 | Putnam et al. ............... 709/231 |
| 2002/0107718 A1 | 8/2002 | Morrill et al. |
| 2002/0116471 A1 * | 8/2002 | Shteyn .......................... 709/217 |
| 2002/0165026 A1 * | 11/2002 | Perkins et al. .................. 463/42 |
| 2002/0194604 A1 * | 12/2002 | Sanchez et al. ................ 725/60 |
| 2003/0105682 A1 * | 6/2003 | Dicker et al. ................... 705/27 |
| 2004/0039659 A1 | 2/2004 | Niwa |
| 2006/0015201 A1 * | 1/2006 | Lapstun et al. ................. 700/94 |
| 2006/0242073 A1 * | 10/2006 | Padawer et al. ................ 705/51 |
| 2006/0269057 A1 * | 11/2006 | Short et al. .................... 380/228 |
| 2007/0027839 A1 * | 2/2007 | Ives .................................. 707/3 |
| 2007/0232223 A1 * | 10/2007 | Bilange ....................... 455/3.06 |
| 2009/0075649 A1 * | 3/2009 | Rolf ........................... 455/426.1 |

FOREIGN PATENT DOCUMENTS

WO 01/45350 * 6/2001 ............ H04L 29/00
WO 2008011141 A2 1/2008

OTHER PUBLICATIONS

"Supporting Enhanced Streaming Services in a Content Distribution Network". C. D. Cranor, M. Green, C. Kalmanek, D. Shur, S. Sibal, C. Sreenan, and J.E. van der Merwe. University College Cork. Cork, Ireland. 2001.*

(Continued)

*Primary Examiner* — William Allen
(74) *Attorney, Agent, or Firm* — Sughrue Mion, PLLC

(57) ABSTRACT

A method and apparatus for system and method that enables e-commerce on a mobile handset device is provided.

28 Claims, 3 Drawing Sheets

(56) References Cited

OTHER PUBLICATIONS

International Search Report, PCT/US07/16450, Jul. 30, 2008.
Written Opinion, PCT/US07/16450, Jul. 30, 2008.
U.S. Non-Final Office Action for U.S. Appl. No. 12/619,865 mailed Jan. 19, 2010.
U.S. Final Office Action for U.S. Appl. No. 12/619,865 mailed May 3, 2010.
U.S. Non-Final Office Action for U.S. Appl. No. 12/619,865 mailed Dec. 4, 2013.
U.S. Final Office Action for U.S. Appl. No. 12/619,865 mailed Apr. 9, 2014.

* cited by examiner

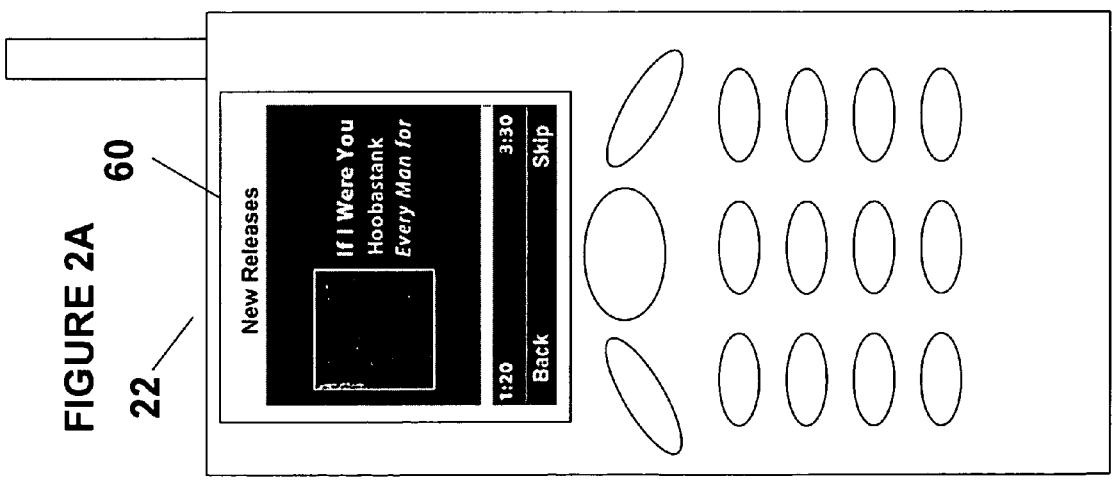
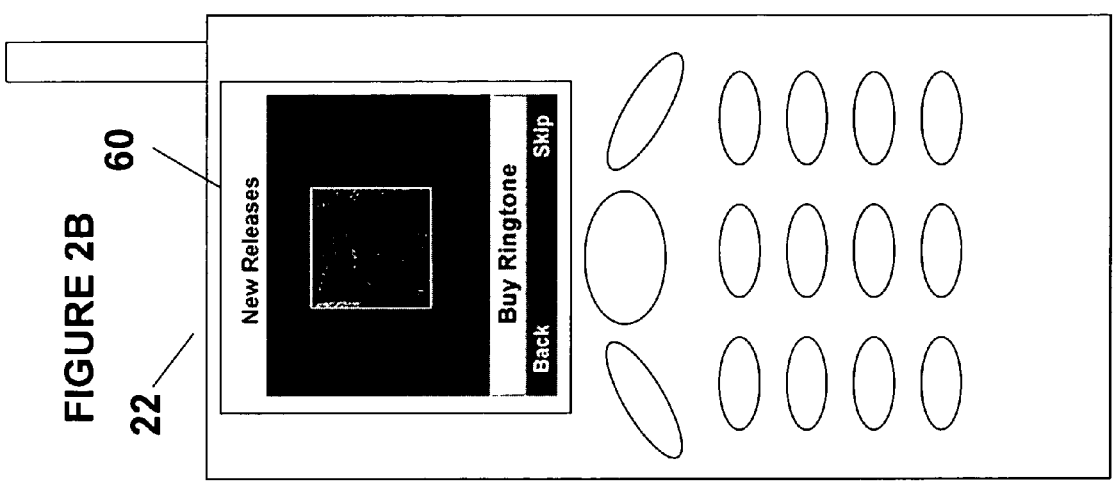
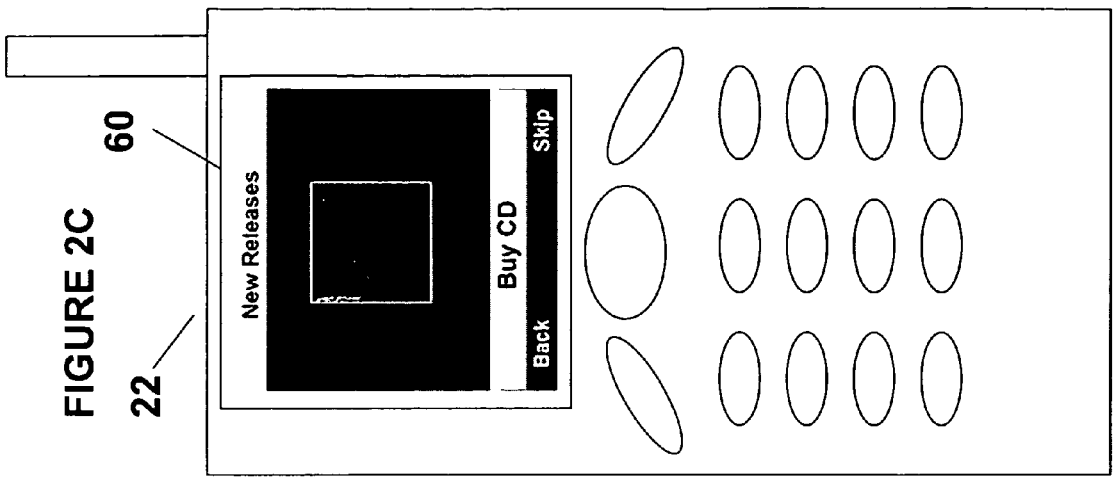

METHOD AND APPARATUS FOR CONDUCTING E-COMMERCE ON A MOBILE HANDSET

FIELD OF THE INVENTION

The invention relates generally to a method and apparatus for conducting e-commerce on a mobile handset.

BACKGROUND OF THE INVENTION

Personal computers (PCs) connected to the Internet enable users to engage in e-commerce. For instance, numerous websites offer products for sale over the Internet, and numerous websites contain links to other websites offering products for sale over the Internet. Typical Internet browsers on PCs allow a user to open multiple browser windows simultaneously. This is a useful feature when linking to other websites, because it allows the user to keep open the window displaying the original website and to generate a new window displaying the website to which the PC is directed through the link. This ability to operate numerous windows simultaneously also allows a user to engage in e-commerce while simultaneously running other applications (such as a word processing program, a music player, etc.).

In recent years, mobile handsets (such as cellular phones and PDAs) have become more powerful and now offer additional functionality beyond just voice communication. For instance, many mobile handsets today allow users to perform web browsing on the Internet and to receive emails. Such devices contain increasingly powerful processors and enhanced video and audio capability. However, the processing power and video and audio capability of a mobile handset is inherently inferior to that of PCs, because consumers demand that mobile handsets contain a small form factor (that can fit in a user's hand), with a light weight, and a long battery life. As a result, the space within a mobile handset in which to place circuit boards, processors, and other electronic components is extremely limited when compared to PCs. In addition, the amount of power stored on the battery that powers the mobile handset is finite and must be conserved as much as possible, meaning that electronic devices must be chosen with power constraints in mind. As a result, the processors in mobile handsets typically are much slower and more limited that PC processors, the video screens are much smaller and of lower resolutions than PC screens, and the audio systems and speakers are inferior to those of PC audio systems.

Due to these inherent constraints in their design, mobile handsets have not yet been designed to engage in e-commerce to the same degree as PCs. In addition, the processing capability of mobile handsets and the limitations of the operating systems and browsers typically used on mobile handsets allow the user to only engage in one activity at a time. That is, unlike PCs, mobile handsets are unable to multi-task between more than one application at a time, and the user cannot run more than one application at a time. As a result of these inherent limitations, the amount of e-commerce conducted on mobile handsets to date has been relatively minimal.

What is needed in the art is a system that allows a user of a mobile handset to engage in e-commerce related to an application being run on the mobile handset. For example, if a user is listening to music, it would be desirable to enable the user to initiate an action to purchase a related ringtone or music CD.

What is further needed in the art is such a system that allows the user to continue his or her original application after initiating an action to purchase a product. For example, if a user is listening to music, it would be desirable to enable the user to initiate an action to purchase a related product while still listening to the music.

SUMMARY OF THE INVENTION

In accordance with the invention, a method and apparatus are provided for enabling a user of a mobile handset device to engage in e-commerce to purchase a product while the user is engaged in an application on the device, such as listening to music or watching a video.

In one embodiment, the mobile device service system provides metadata to a mobile handset user along with streamed audio or video content. The metadata is used to create the ability for the user to purchase a product while the user is listening to music or watching a movie on a mobile handset. The metadata will be used to enable a user interface feature (such as a button on the screen) that when selected will initiate an action to purchase a product relevant to the music or movie content being listened to or watched by the user, such as a ringtone, CD, DVD, or video-on-demand.

In accordance with another aspect of the invention, a method and apparatus are provided that enable the user to engage in e-commerce while still operating the original application without terminating that application to complete the e-commerce transaction.

BRIEF DESCRIPTION OF THE DRAWINGS

FIG. 2A illustrates a mobile handset displaying a typical user interface for a streaming music application;

FIG. 2B shows the same mobile handset of FIG. 2A with a button to purchase a ringtone;

FIG. 2C shows the same mobile handset of FIGS. 2A and 2B with a button to purchase a music CD.

DETAILED DESCRIPTION OF PREFERRED EMBODIMENTS

Figure 1:
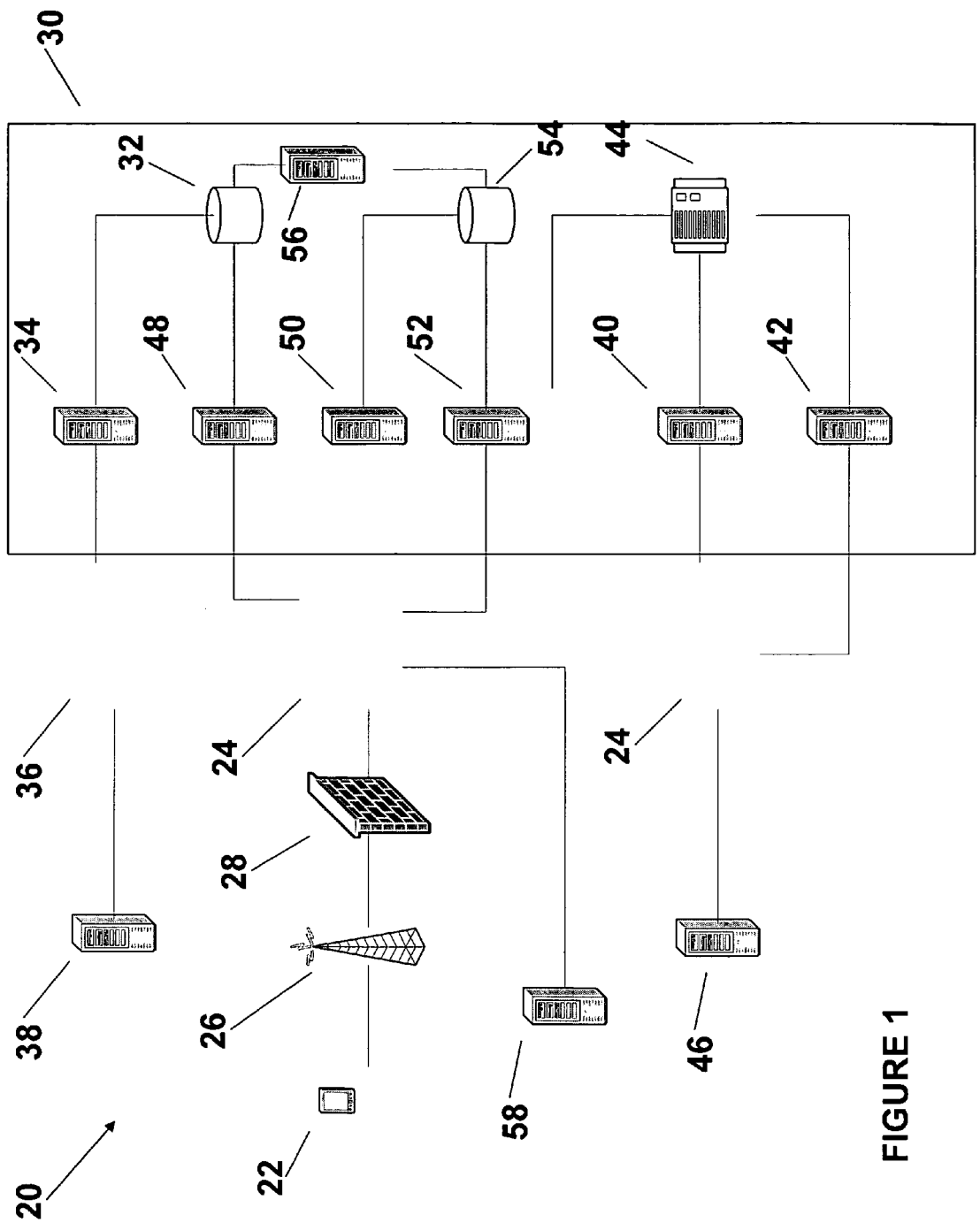
FIG. 1 is a block diagram of a mobile handset service system.

FIG. 1 depicts a typical mobile handset service system 20. The mobile handset service system 20 provide one or more services, such as movies, videos, sports information, music, etc. to a mobile handset 22 that includes a client application, such as a JAVA piece of code, that processes the incoming service data and displays the service data to the user of the mobile device. The mobile handset 22 may be any processing unit based device that is hand-sized with sufficient processing power, memory, display and connectivity capabilities to execute the client application, receive the service data and display that service data. For example, the mobile device may be a PDA, mobile phone, wireless email device (such as the Blackberry), or other handheld device. In the example shown in FIG. 1, the mobile device 22 couples to a communications link 24, such as the Internet, over a wireless network 26 and a firewall 28. The mobile handset service system 20 also has a service unit 30 that performs various function and operations for the mobile handset service system.

The service unit 30 may include a user information storage unit 32 that stores information about each user of the mobile handset service system including user billing information and user service personalization information. The service unit 30 may also have a billing server 34 that performs a billing operation for the services provided to the user. In the example shown in FIG. 1, the billing for the services are communicated over a secure link 36, such as a secure socket layer (SSL) connection, to a mobile handset carrier billing system 38 so that the mobile handset carrier can provide the bill for the services on the monthly invoice of the user of the mobile handset. Alternatively, the service unit 30 can directly bill the user. The service unit 30 may also include a live content ingester 40, a clip digester 42 and a content/asset storage unit 44 that handle the service content (such as music, movies, etc.) from a third party 46 that will be delivered by the mobile handset service system. The live content ingester receives any live content and processes it and then stores the live content in the content/asset storage unit 44 in various output encoding and file formats. The clip digester 42 receives non-live content and data, processes it and then stores the clips in the storage unit 44 in various output encoding and file formats.

The service unit 30 may further include a menu/personalization unit 48, a reporting unit 50, a streaming unit 52, a log database 54 and a data mining unit 56. The menu/personalization unit 48, the reporting unit 50, the streaming unit 52 and the data mining unit 56 may preferably each be server computers. The menu/personalization unit 48 generates and delivers the mobile handset service user interfaces to the user that may also be customized by the user based on the customization information stored in the user information storage unit 32. The streaming unit 52 may preferably support the real-time streaming protocol (RTSP) and the hypertext transfer protocol (HTTP) and may deliver/stream the service content to the mobile handset 22 over the link 24. The streaming unit 52 may request the service content from the content store 44 and may store service content information in the log store 54. The reporting unit 50 may generate a report about various aspects of the service unit and its operations. The data mining unit 56 collects user behavior information which is then mined to determine any recommendations and personalizations for users of the system.

Mobile handset 22 may include circuitry for running an operating system and applications, circuitry for processing data and metadata, and circuitry for rendering audio content and video content. All of the circuitry can be contained in a single integrated chip, in multiple integrated chips, or in a combination of some number of integrated chips and other electronic components.

FIG. 1 also shows an exemplary computing device 58 that hosts a website and/or offers products for sale. Computing device 58 connects to the Internet 24. It is to be understood that there could be an unlimited number of computing devices 58 connected to the Internet 24 in this fashion.

A user of mobile handset 22 can run various applications on the handset, such as an application that enables the user to listen to music or to watch video content streamed from streaming unit 52. In one embodiment of the invention, streaming unit 52 will send the digital content to the mobile handset 22 and will also send metadata to the mobile handset 22. The metadata can include information such as the title of the song or video, the duration of the song or video, etc. The metadata also can include information that will enable the user of mobile handset 22 to engage in e-commerce. For example, the metadata could include a URL for a website that may preferably be hosted on one or more computing devices 58 and that offers products for sale that are relevant to the content being streamed to mobile handset 22. In the alternative, the metadata could include information to be used to create a user-selectable option on the user interface of mobile handset 22 that will allow the user to purchase relevant products through a means other than a link. Examples of such products might include ringtones that contain the same music being streamed to mobile handset 22, CDs containing the same music, DVDs containing the video being streamed to mobile handset 22, etc. Mobile handset 22 receives the metadata and generates a button, menu item, link, etc. that is visible on the video display 60 of mobile handset 22 to enable the purchase of products related to the streamed content.

Referring now to FIGS. 2A, 2B, and 2C, mobile handset 22 is shown in greater detail. It is to be understood that FIGS. 2A, 2B, and 2C are exemplary and that the invention is not limited to the particular aesthetic or functional features displayed in the figures. Mobile handset 22 includes a video display 60. Mobile handset 22 includes a speaker (not shown) that generates audio content. Thus, a user of mobile handset 22 can watch video content of video display 60 and listen to audio content through a speaker.

In FIG. 2A, video display 60 shows an exemplary user interface for one embodiment of the invention. The video display 60 shows cover art for the music being streamed to mobile handset 22 by streaming unit 52. This cover art was streamed as part of the metadata associated with the music.

FIG. 2B shows a different screen within the same user interface shown in FIG. 2A. This screen might be accessed by pressing a certain button or sequence of button on the mobile handset 22, or by selecting an option on a menu. In FIG. 2B, video display 60 shows a button titled "Buy Ringtone." If the user selects this button, mobile handset 22 will initiate an action to enable the user to buy a ringtone. For example, if the button constitutes a link, mobile handset 22 may launch an Internet browser and the browser will be directed to the URL associated with the link, such as a website hosted by computing device 58 at that URL. This URL was sent to mobile handset 22 by streaming unit 52 as part of the metadata associated with the music. Providing a URL as part of the metadata allows the user of a mobile handset to engage in e-commerce to purchase products that are related to the audio or video content that the user is listening to or watching. This transaction will not be transparent to the user, because the underlying application will need to be terminated when the browser is launched.

In the alternative, if the button shown in FIG. 2B does not constitute a link, when selected it could communicate with service unit 30 that the user wishes to purchase the relevant ringtone. Service unit 30, upon receipt of such a communication, could initiate a purchase transaction through any number of means, as discussed in greater detail below with reference to FIG. 3.

FIG. 2C shows a different screen within the same user interface shown in FIGS. 2A and 2B. This screen might be accessed by pressing a certain button or sequence of button on the mobile handset 22, or by selecting an option on a menu. In FIG. 2C, video display 60 shows a button titled "Buy CD." When the user selects this button, the same activities will occur as discussed previously for FIG. 2B, except that instead of purchasing a ringtone, the user will purchase a CD associated with the underlying music content.

It is to be understood that a button could be replaced by another selection means, such as a soft key on mobile handset 22.

Computing device 58 and service unit 30 typically are operated by different persons or entities and their billing systems typically are not coordinated. When the user of a PC accesses a website that contains a link to a third-party commercial website, the user will be able to select a link that opens a new window in the Internet browser to access that third-party commercial website without terminating the window displaying the website that contains the link. Thus, the user of a PC can interact with multiple websites simultaneously. By contrast, the user of a mobile handset such as mobile handset 22 only will be able to access one website or run one application at a time. Thus, when the user of mobile handset 22 is listening to music being streamed by streaming server 52 and then selects a link to a URL for a website hosted by third-party server 58, the original music application will be terminated and an Internet browser will be launched to the website.

Figure 3:
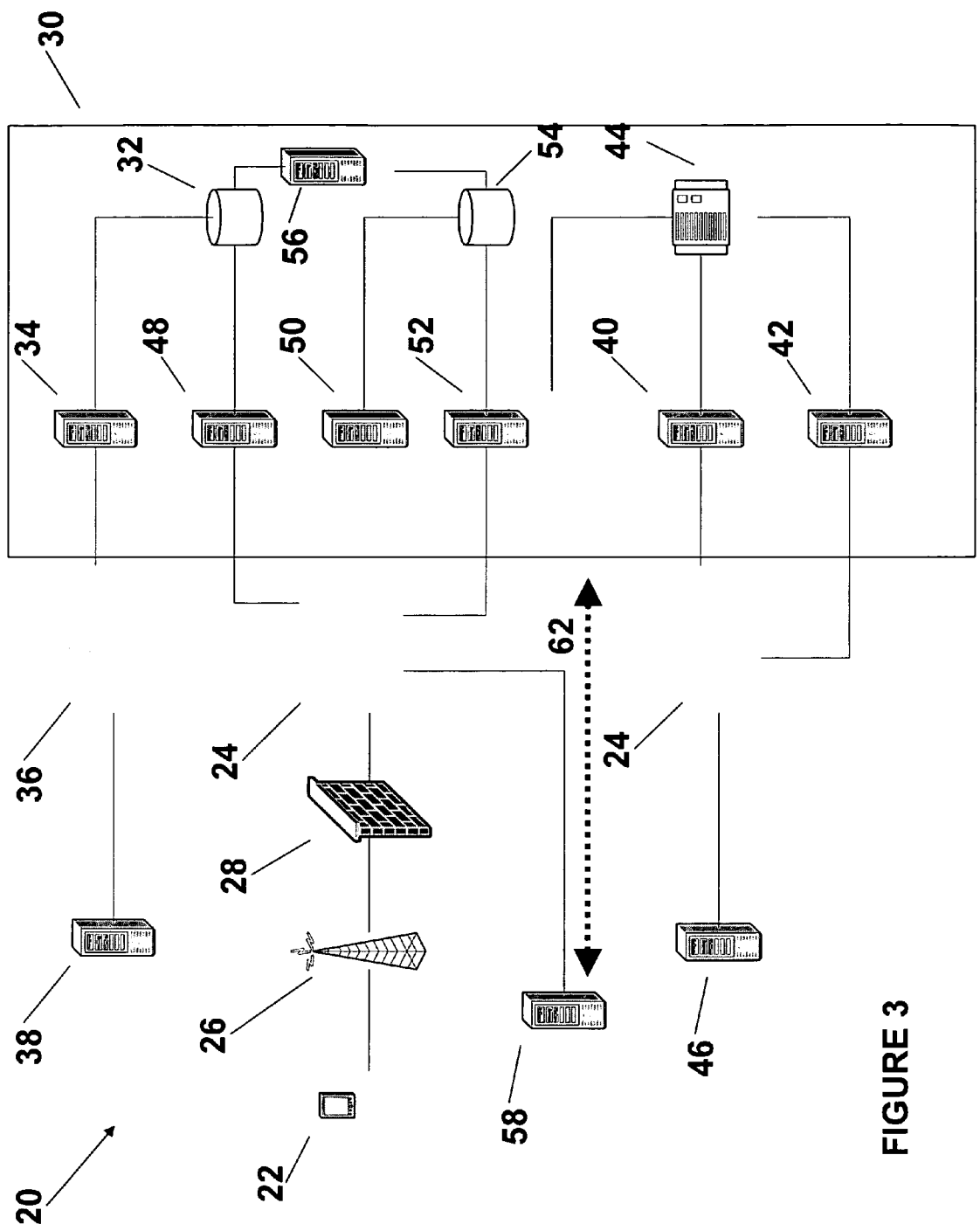
FIG. 3 is a block diagram of a mobile handset system that allows the user to engage in e-commerce without terminating the original application that is running on the mobile handset.

FIG. 3 shows an example of a system in which the original application on the mobile handset is not terminated when the e-commerce application is being executed. FIG. 3 depicts a coupling 62 between service unit 30 and third-party server 58. This coupling 62 can be a connection over the Internet or other network, a physical connection, or even an integration of service unit 30 and third-party server 58 into a single server or collection of servers. In this system, mobile handset 22 will display a button on the mobile handset display. The information displayed in and associated with the button were transmitted in the metadata from streaming unit 52 to mobile handset 22. When a user selects the button, instead of terminating the original application and launching a web browser, mobile handset 22 will instead communicate with service unit 30 and will indicate that the user selected the button (for example, a button titled "Buy Ringtone"). Service unit 30 then will understand that the user wishes to purchase the product associated with that button and will communicate with computing device 58 (which is the seller of such product) in a manner transparent to the user of mobile handset 22 to provide the requested product to the user and to handle billing for that transaction (for example, by directly billing the user's account with the operator of service unit 30 or the account with the mobile handset carrier, or by sending the transaction information to the operator of computing device 58 so that such operator can bill the user for the purchase) without terminating the music application. Thus, the user will be able to engage in commercial activity (e.g., the purchase of a ringtone) without disrupting the music or video application being run on mobile handset 22 at the time of the transaction. Thus, instead of directing consumers to purchase directly from a website hosted on computing device 58 (as would be the case if the selected button constitutes a link), service unit 30 instead receives the request from the user, and will coordinate with computing device 58 or other systems to fulfill the purchase request in a manner transparent to the user such that the user can continue the application.

In the alternative, if the relevant product is sold by the operator of service unit 30, then service unit 30, upon receiving the purchase request after the user selects the button, could service the request directly if configured to handle e-commerce purchases, or it could directly communicate with a computing device operated by the same operator of service unit 30 which would be no different in operation than communicating with computing device 58.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for facilitating activity on a mobile handset without disrupting an application that is run on the mobile handset, the method comprising:
   receiving, by the mobile handset from a server computer, streaming content and associated metadata on said mobile handset, wherein said metadata comprises data associated with a product related to said content and data for generating a user-selectable option to purchase said product;
   receiving, by the mobile handset from said server computer, a customized user interface generated by said server computer based on user customization information comprising personalized recommendations, the personalized recommendations being determined from user behavior information collected by said server computer;
   running, by the mobile handset, an application on said mobile handset to render said content;
   generating, by the mobile handset, said user-selectable option on said user interface to be displayed on said mobile handset, the generating said user-selectable option being based on the metadata; and
   responsive to detecting, by the mobile handset, selection of said user-selectable option, initiating, by the mobile handset, purchase of said product without terminating said application rendering said content,
   wherein the initiating comprises:
      communicating, by the mobile handset, to the server computer an indication of the user-selectable option being selected;
      transmitting, by the server computer, a request for said product to a third-party server through an Internet network, the third-party server configured to sell the product related to the content, and
      providing, by the server computer, said product, received from said third-party server, to said mobile handset, without launching a website of said third-party server on said mobile handset.

2. The method of claim 1, wherein said content is audio content.

3. The method of claim 2, wherein said product is a ringtone.

4. The method of claim 2, wherein said product is music-related.

5. The method of claim 1, wherein said content is video content.

6. The method of claim 5, wherein said product is a ringtone.

7. The method of claim 5, wherein said product is a video DVD.

8. The method of claim 5, wherein said product is a video-on-demand product.

9. The method of claim 1, wherein:
   said user-selectable option is one of a button, a menu item and a link, configurable to launch an e-commerce application to initiate purchase of said product.

10. A method for facilitating activity on a mobile handset without disrupting an application that is run on the mobile handset, the method comprising:
    streaming, by a mobile handset service unit comprising a server computer, content and associated metadata to a mobile handset, wherein said metadata comprises an identifier for a product related to said content and data for generating a user-selectable option to purchase said product;

generating, by said mobile handset service unit, a customized user interface to be rendered by an application on said mobile handset, wherein said customized user interface is generated based on user customization information comprising personalized recommendations, the personalized recommendations being determined from user behavior information collected by said mobile handset service unit, and wherein said user-selectable option on said user interface is generated by the mobile handset to be displayed on said mobile handset, the generating said user-selectable option being based on the metadata;

receiving, by said mobile handset service unit, a signal from said mobile handset indicating selection of said user-selectable option; and communicating, by said mobile handset service unit to and/or from a seller's computing device configured to sell said product to enable purchase of said product without terminating said application, wherein the communicating comprises:
transmitting a request for said product to a third-party server through an Internet network, the third-party server configured to sell the product related to the content, and providing said product, received from said third-party server, to said mobile handset, without launching a website of said third-party server on said mobile handset.

11. The method of claim 10, wherein said content is audio content.

12. The method of claim 11, wherein said product is a ringtone.

13. The method of claim 11, wherein said product is music-related.

14. The method of claim 10, wherein said content is video content.

15. The method of claim 14, wherein said product is a ringtone.

16. The method of claim 14, wherein said product is a video DVD.

17. The method of claim 14, wherein said product is a video-on-demand product.

18. The method of claim 10, further comprising:
billing, by a system associated with said mobile handset service unit, said user of said mobile handset directly for said purchase of said product;
wherein said user-selectable option is one of a button, a menu item and a link, configurable to launch an e-commerce application to initiate purchase of said product.

19. The method of claim 10, further comprising:
sending transaction information to said seller's computing device for billing said user of said mobile handset for said purchase of said product;
wherein said user-selectable option is one of a button, a menu item and a link, configurable to launch an e-commerce application to initiate purchase of said product.

20. A system for facilitating activity on a mobile handset without disrupting an application that is run on the mobile handset, the system comprising:
a server computer; and
a mobile handset comprising:
circuitry configured to receive, from a server computer, streaming content and associated metadata, wherein said metadata comprises an identifier for a product related to said content and data for generating a user-selectable option to purchase said product;
circuitry configured to receive, from said server computer, a customized user interface generated by the server computer based on user customization information comprising personalized recommendations, the personalized recommendations being determined from user behavior information collected by said server computer;
a processor configured to execute an application on said mobile handset to render said content;
circuitry configured to generate said user-selectable option on said user interface to be displayed on said mobile handset, wherein said user-selectable option is generated based on the metadata; and
circuitry configured to initiate, responsive to detecting selection of said user-selectable option, purchase of said product without terminating said application rendering said content,
wherein the mobile handset is configured to, without launching a website on the mobile handset:
communicate to the server computer an indication of the user-selectable option being selected; and
receive, from the server computer, the product, wherein the product is sold by a third-party server, and
the server computer configured to:
transmit a request for said product to said third-party server through an Internet network; and
provide said product, received from said third-party server, to said mobile handset, without launching a website of said third-party server on said mobile handset.

21. The system of claim 20, wherein said content is audio content.

22. The system of claim 20, wherein said content is video content.

23. The system of claim 21, wherein said product is a ringtone.

24. The system of claim 21, wherein said product is music-related.

25. The system of claim 22, wherein said product is a ringtone.

26. The system of claim 22, wherein said product is a video DVD.

27. The system of claim 22, wherein said product is a video-on-demand product.

28. The system of claim 20, wherein:
said user-selectable option is one of a button, a menu item and a link, configurable to launch an e-commerce application to initiate purchase of said product.

\* \* \* \* \*